United States Patent [19]

Schunck et al.

[11] 4,131,709

[45] Dec. 26, 1978

[54] ADHESIVE COMPOSITIONS

[75] Inventors: Erich Schunck, Hochheim, Main; Heinz Schmelzer, Rummelsheim; Richard Sattelmeyer, Schlangenbad, Georgenborn, all of Germany

[73] Assignee: Hoechst Aktiengesellschaft, Frankfurt am Main, Germany

[21] Appl. No.: 752,176

[22] Filed: Dec. 20, 1976

[30] Foreign Application Priority Data

Dec. 27, 1975 [DE] Fed. Rep. of Germany ....... 2558858

[51] Int. Cl.$^2$ ............................................. B22B 7/12
[52] U.S. Cl. ............................... 428/261; 260/27 BB; 260/31.2 R; 260/32.8 A; 260/33.2 R; 260/33.6 A; 260/846; 428/286; 428/411; 428/460; 428/462; 428/473; 428/494; 428/518; 428/519; 428/520
[58] Field of Search .................... 428/261; 260/26, 25, 260/27 BB, 33.6 AQ, 17, 2, 194 A, 829, 846, 33.8 A, 28.5 B

[56] References Cited

U.S. PATENT DOCUMENTS

| 3,239,478 | 3/1966 | Harlan ............................ 260/27 BB |
| 3,325,430 | 6/1967 | Grasley .......................... 260/27 BB |
| 3,917,607 | 11/1975 | Crosalaud et al. ............. 260/27 BB |

FOREIGN PATENT DOCUMENTS 1262579 1/1972 United Kingdom.
1426497 1/1976 United Kingdom.

*Primary Examiner*—Lewis T. Jacobs
*Attorney, Agent, or Firm*—Hammond & Littell

[57] ABSTRACT

An adhesive composition based on

I. 100 parts by weight of a block copolymer with at least two polymer blocks (A) and at least one polymer block (B), wherein the polymer blocks (A) comprise non-elastomeric blocks with an average molecular weight of from 2000 to 125,000 derived from an aromatic hydrocarbon substituted by one of the groups consisting of the members monoalkenyl and monoalkylidene and wherein not more than 25% of the original double bonds are hydrogenated, and polymer block (B) is an elastomeric block with an average molecular weight of from 10,000 to 250,000 derived from a conjugated diene, wherein at least 75% of the aliphatic unsaturated bonds are hydrogenated;

II. 10 to 200 parts by weight of at least one cohesion-increasing resin selected from the group consisting of an alkylphenol resin, an arylphenol resin, a phenol-colophony-adduct and a rosin-modified phenol resin;

the components dissolved in at least one solvent and a process of bonding one substrate to another substrate which comprises applying to the surface of either substrate an adhesive composition as claimed in claim 1 and placing the surfaces to be bonded together.

10 Claims, No Drawings

ADHESIVE COMPOSITIONS

This invention relates to novel adhesive compositions for use as contact adhesives having improved exposure times and thermal stabilities.

German Offenlegungsschrift No. 22 46 036 describes adhesive compositions based on (a) a block copolymer with at least two polymer blocks (A) and at least one polymer block (B), the blocks (A) being non-elastomeric polymer blocks of a monoalkenyl- or monoalkylidene-substituted aromatic hydrocarbon with an average molecular weight of from 2000 to 125,000, wherein not more than 25% of the original double bonds are hydrogenated, and blocks (B) are elastomeric polymer blocks of a conjugated diene with an average molecular weight of from 10,000 to 250,000 wherein at least 75% of the aliphatic double bonds are hydrogenated; (b) 25 to 300 parts by weight of a tackifier resin which is predominantly compatible with block (B) of the block copolymer; (c) 10 to 200 parts by weight of a second predominantly aromatic resin with a softening point of more than 100° C. and being predominantly compatible with the blocks (A) of the block copolymer; and (d) 0 to 300 parts by weight of a diluent oil which is predominantly compatible with block (B) of the block copolymer.

Monoalkenyl- or monoalkylidene-substituted aromatic hydrocarbons for the polymer blocks (A) in the compositions described above are, for example, styrene, α-methylstyrene, tert.-butylstyrene and vinyl toluene; and for the block (B), conjugated dienes, for example, butadiene or isoprene may be used. The approximate structure of such copolymers may be represented, for example, by the sequence

|   | Block A) | Block B) | Block A) |
|---|---|---|---|
|    | Polystyrene - | hydrogenated polybutadiene - | polystyrene |
| or, | Polystyrene - | hydrogenated polyisoprene - | polystyrene |

The tackiness and thermal stability of an adhesive mixture can be substantially affected with resins, and which of these two properties is improved depends on the structure of the resin. The optimum properties required may be obtained with combinations of various resins. The above-mentioned Offenlegungsschrift No. 22 46 036 mentions that the effectiveness of the resins with regard to tackiness and thermal stability depends on their compatibility with one or other of the blocks of the block copolymer.

This Offenlegungsschrift describes those resins (b) which are compatible with block (B) but substantially incompatible with blocks (A) as tackifier resins. Resins of this kind are polyfunctional esters of optionally hydrogenated and polymerised colophony, polyterpene resins and hydrocarbon resins.

The resins (c), recommended for increasing the thermal stability, which are compatible with blocks (A) and having a softening point of above 100° C. (ball and ring apparatus, according to ASTM E 28), are, for example, cumarone-indene resins, polystyrene resins, polyindene resins, α-methylstyrene homopolymers, and vinyl toluene-α-methyl styrene copolymers.

It is particularly emphasised in Offenlegungsschrift No. 22 46 036 that when resins which are either substantially compatible with both types of polymer block or else incompatible with both types of polymer block are used, either inactive or heterogeneous mixtures are obtained, or mixtures having properties which are inadequate in one respect or another are obtained, with the result that their usefulness is greatly restricted.

A pressure-sensitive adhesive is also known which is an A—B block copolymer consisting essentially of two cross-linked polymer blocks (A) and (B), each block having been formed from a monomer which is virtually absent from the other block. As the tackifier resin, polyterpene, terpenephenol, hydrogenated colophony, esters of hydrogenated colophony, esterified colophony and stabilised ester resins, styrene copolymers and hydrocarbon resins are used. To increase the shear and tensile strengths of these adhesives, up to 30%, based on the total block copolymer, of a multi-block copolymer may be used.

Furthermore, a solvent-dispersed composition of similar structure is known wherein the copolymer consists only of an A—(B—A)$_n$ block copolymer, where n represents an integer of at least 1. This composition may be used as an adhesive, printing ink or paint primer.

These known adhesives are suitable for sticking together various materials. However, their range of applications is restricted by their relatively low thermal strength and, in some cases, very short period of tackiness.

We have now found that the properties of such block copolymers can be improved by adding resins which increase cohesion.

Thus, according to one aspect of the present invention there is provided an adhesive composition comprising I. 100 parts by weight of a block copolymer with at least two polymer blocks (A) and at least one polymer block (B), wherein the polymer blocks (A) comprise non-elastomeric blocks with an average molecular weight of from 2000 to 125,000 derived from a monoalkenyl- or monoalkylidene-substituted aromatic hydrocarbon and wherein not more than 25% of the original double bonds are hydrogenated, and polymer block (B) is an elastomeric block with an average molecular weight of from 10,000 to 250,000 derived from a conjugated diene, wherein at least 75% of the aliphatic unsaturated bonds are hydrogenated;

II. 10 to 200 parts by weight of a cohesion-increasing resin or resin mixture of an alkylphenol resin, an arylphenol resin, a phenol-colophony-adduct or a rosin-modified phenol resin; and a solvent or solvent mixture.

The improvements that are obtained using adhesives according to the present invention are surprising since the statement regarding the connection between compatibility and effectiveness in Offenlegungsschrift No. 22 46 036 does not apply to these resins. That is, when applied as a film, they show a greater or lesser degree of incompatibility both with blocks (A) and also with block (B) types. However, the effect on thermal stability is nevertheless from good to excellent. Values for thermal stability not hitherto obtained can be obtained particularly with alkylphenol resins.

The adhesive compositions according to the invention may, if desired, additionally comprise (III) 10 to 200 parts by weight of a resin or mixture of resins improving the tackiness.

The quantity of resins (II) used, is preferably 30 to 70 parts by weight, and the quantity of resins (III) is preferably 20 to 100 parts by weight.

Block (A) generally has an average molecular weight of preferably 5000 to 50,000 and block (B) generally has an average molecular weight of preferably 30,000 to 150,000. Both blocks may be synthesised from the monomers mentioned above.

Particularly suitable alkyl- or arylphenol resins are the condensation products of p-substituted phenols and aldehydes, preferably formaldehyde, in a molar ratio of 1:0.9 to 2.5, preferably 1:1.2 to 2.2, prepared using acid or alkaline catalysts. The alkylphenols are preferably those having alkyl groups with 1 to 12 carbon atoms, such as p-n-propylphenol, the p-substituted-n- or tert.-butyl- and amylphenols and p-n-nonylphenol. A suitable arylphenol is, for example, p-phenylphenol. These resins may be prepared by conventional processes.

Suitable phenol-colophony adducts include, for example, those prepared from phenol and natural resin acids in a molar ratio of 5:1 to 1:5, preferably 3:1 to 1:3, in the presence of Friedel-Crafts catalysts and having melting points of from 100° to 150° C., preferably 110° to 140° C. (determined according to the capillary method), and acid numbers of 30 to 90, preferably 50 to 80.

Suitable rosin-modified phenol resins are, for example, reaction products of phenol-aldehyde resins, preferably phenol-formaldehyde resins with natural resin acids which are esterified with polyhydric alcohols, preferably glycerol, under pressure and with heating.

As the resins (III) for improving tackiness, the special resins in group (b) of Offenlegungsschrift No. 22 46 036 may be used, for example. Moreover, terpene phenol resins are particularly suitable, the addition of these resins to A—B—A block copolymers already being known. Suitable terpene phenol resins may be prepared by condensing α- or β-pinenes (or the industrial mixtures thereof, e.g. turpentine oil) with phenol. The terpene phenol resins primarily improve the tackiness of such mixtures and thus increase the range of applications of the more cohesive block copolymers. By combining the resins (II) with the terpene phenol resins, any desired variation of thermal stability and length of tackiness of the mixtures may be obtained.

As the solvents for the adhesive compositions, conventional solvents may be used, and, if desired, in the form of mixtures, particularly aromatic and aliphatic hydrocarbons, esters and ketones, and preferably a mixture of ethyl acetate, toluene and light petrol in the volume ratio 1:1:1 and having a boiling range from 80° to 100° C. Generally, 200 to 600, preferably 300 to 400 parts by weight of solvent are used to 100 parts by weight of component (I).

The adhesive mixtures according to the invention are suitable as contact adhesives for use in the shoemaking, building and motor industries, particularly for bonding non-porous materials such as leather, rubber, metals, plastics and textiles, but preferably for bonding polyvinyl chloride.

The following Tables give the values for the peel strengths, thermal stabilities and the period of tackiness of the compositions according to the invention. The individual compositions were prepared as follows (T represents parts by weight):

300 T of a solvent mixture of ethyl acetate, toluene and petrol (boiling range 80° to 100° C.) in a volume ratio of 1:1:1 and the quantities of resin given in the tables were added to 100 T of styrene-butadiene block copolymer.

TABLES 1 AND 2

The peel strengths and thermal stabilities were tested using the test methods for elastomer adhesives of the former Reichhold-Albert-Chemie AG. on samples measuring 2 × 8 cm. The Tables show that the compositions of block copolymers and alkylphenol resin according to the invention have an increased peel strength at elevated temperatures and a higher thermal stability than the comparison examples.

By adding tackifier resins such as terpene phenol resin, the "open time" or period of tackiness, i.e. the interval after application of the adhesive within which it is still possible to obtain a strong bond between the parts which are to be stuck together, with a small degree of compression, can be substantially increased (Examples 1 to 3).

In Comparison Example 2 a cumarone-indene resin is mixed with a conventional tackifier resin in the same weight ratio as in Example 2, and inferior test results are obtained. If the quantity of added tackifier resin, according to this invention, is increased (Example 3) a substantial improvement in the open time is obtained, while at the same time the peel strength and thermal stability do not fall below the values corresponding to the state of the art (Comparison 3).

Comparison Example 4 shows the decreasing thermal stability of a known adhesive compound, compared with the compositions according to the invention.

Examples 4 to 6 show the increase in peel strength and thermal stability of adhesives containing the resin additives according to the invention, compared with the comparison Example 5.

Table 1

| | | | | | |
|---|---|---|---|---|---|
| | | | Open time, peel strength and thermal stability of adhesive to polyvinyl chloride | | |
| Example | 100 T styrene-butadiene block copolymer 300 T solvent | Open Time (min) | Peel strength $(N.cm^{-1})$ 20° C | 50° C | Thermal Stability (min.) (150 g.cm$^{-1}$ width to 8 cm length) 100° C |
| 1 | +50 T Alkylphenol resin | 5 | 49 | 35 | 38 |
| 2 | +35 T Alkylphenol resin and 15 T Terpenephenol resin | 15 | 51 | 30 | 27 |
| 3 | +15 T Alkylphenol resin and 35 T Terpenephenol resin | 90 | 46 | 22 | 17 |
| Comparison 1 | +50 T Cumarone-Indene resin | 5 | 48 | 25 | 19 |
| Comparison 2 | +35 T Cumarone-Indene resin and 15 T Glycerol ester of hydrogenated Colophony | 10 | 50 | 21 | 15 |
| Comparison 3 | +15 T Cumarone-Indene resin and 35 T Glycerol ester of hydrogenated Colophony | 30 | 45 | 16 | 12 |
| Comparison | | | | | |

Table 1-continued

Open time, peel strength and thermal stability of adhesive to polyvinyl chloride

| Example | 100 T styrene-butadiene block copolymer 300 T solvent | Open Time (min) | Peel strength (N.cm$^{-1}$) 20° C | 50° C | Thermal Stability (min.) (150 g.cm$^{-1}$ width to 8 cm length) 100° C |
|---|---|---|---|---|---|
| 4 | +50 T Terpenephenol resin | 120 | 45 | 21 | 5 |

Table 2

Peel Strength and thermal stability of adhesive to canvas

| Example | 100 T styrene-butadiene block copolymer 300 T solvent | Peel strength (N.cm$^{-1}$) 20° C | 50° C | Thermal stability (min.) 100° C | [150 g.cm$^{-1}$ width 8 cm length] |
|---|---|---|---|---|---|
| 4 | +50 T Alkylphenol resin | 47 | 36 | 34 | |
| 5 | +50 T Colophony-Phenol-adduct | 34 | 23 | 7 | |
| 6 | +50 T modified-phenol resin | 39 | 26 | 13 | |
| Comparison 5 | without added resin | 31 | 19 | 5 | |

We claim:

1. An adhesive composition consisting essentially of
I. 100 parts by weight of a block copolymer with at least two polymer blocks (A) and at least one polymer block (B), wherein the polymer blocks (A) comprise non-elastomeric blocks with an average molecular weight of from 2000 to 125,000 derived from an aromatic hydrocarbon substituted by one of the groups consisting of the members monoalkenyl and monoalkylidene and wherein not more than 25% of the original double bonds are hydrogenated, and polymer block (B) is an elastomeric block with an average molecular weight of from 10,000 to 250,000 derived from a conjugated diene, wherein at least 75% of the aliphatic unsaturated bonds are hydrogenated;
II. 10 to 200 parts by weight of at least one cohesion-increasing resin selected from the group consisting of an alkylphenol aldehyde resin, an arylphenol aldehyde resin, a phenol-colophony-adduct and a rosin-modified phenol aldehyde resin; the components dissolved in at least one solvent.

2. A composition as claimed in claim 1 additionally comprising
III. 10 to 200 parts by weight of at least one tackify improving resin.

3. A composition as claimed in claim 1 wherein the alkyl- and arylphenol aldehyde resin is a condensation product obtained in the presence of a catalyst, selected from the group consisting of acid and alkaline catalysts and derived from the components in a molar ratio of phenol : aldehyde of from 1:0.9 to 2.5.

4. A composition as claimed in claim 1 wherein the alkylphenol component of resin II contains 1 to 12 carbon atoms in the alkyl group.

5. A composition as claimed in claim 1 wherein the phenol-colophony adduct has the features:
  a. is derived from phenol and natural resin acid in a molar ratio of from 5:1 to 1:5,
  b. prepared in the presence of a Friedel-Crafts catalyst,
  c. has a melting point of from 100° to 150° C. (determined according to the capillary method) and
  d. has an acid number of from 30 to 90.

6. A composition as claimed in claim 1 wherein the rosin-modified phenol resin is a reaction product of phenol-aldehyde resin and natural resin acid esterified with polyhydric alcohols.

7. A composition as claimed in claim 1 wherein the solvent is present in an amount of from 200 to 600 parts by weight based on 100 parts of component (I).

8. A process of bonding one substrate to another substrate which comprises applying to the surface of either substrate an adhesive composition as claimed in claim 1 and placing the surfaces to be bonded together.

9. A process as claimed in claim 8 wherein at least one of the substrates is selected from the group consisting of leather, rubber, metal, plastic material and textile.

10. A process as claimed in claim 8 wherein the substrate is polyvinyl chloride.